Figure 1:
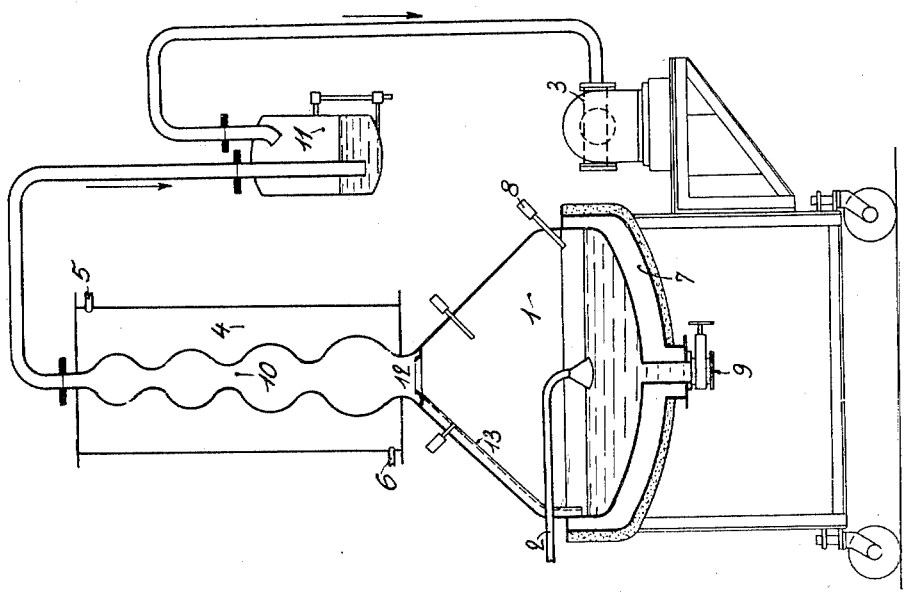

May 30, 1950    M. P. P. FLANZY    2,509,633
DESULFURIZATION OF VEGETABLE FOODSTUFFS
Filed Feb. 25, 1947

Inventor:
Michel Paul Pierre Flanzy

Patented May 30, 1950

2,509,633

UNITED STATES PATENT OFFICE 2,509,633

DESULFURIZATION OF VEGETABLE FOODSTUFFS

Michel Paul Pierre Flanzy, Narbonne, France, assignor to Jeanne M. L. P. Fabre, Servian, France Application February 25, 1947, Serial No. 730,823
In France March 15, 1943

3 Claims. (Cl. 99—154)

This invention relates to the desulphurisation of vegetable foodstuffs such as fruit, vegetables and their juices which have been treated for their preservation with sulphur dioxide or its derivatives.

The methods in general use remove the free sulphur dioxide but leave the greater part of the combined sulphur dioxide in the treated products. They also spoil the original taste of the products by the removal of volatile constituents and reaction products.

The invention aims at a much more complete removal of the sulphur dioxide without impairing the taste of the foodstuffs.

According to the invention, both the free and the combined sulphur dioxide are caused to evolve and those condensable products which are carried off with the sulphur dioxide are condensed and returned to the mass under treatment without mixing with the sulphur dioxide which is being evolved.

The evolution of the sulphur dioxide can be effected by agitation of the mass to be treated. This agitation should be as vigorous as possible so as to bring about a series of shocks at a very high frequency. It can be effected at atmospheric or sub-atmospheric pressure at any temperature. A large amount of froth or foam may be produced which can be made to settle down by blowing in an inert gas.

The sulphur dioxide can also be driven off by boiling. The temperature, the pressure and the length of the treatment are dependant variables and depend also on the nature of the products being treated. The evolution of the sulphur dioxide can be helped by agitation of the boiling mass either by mechanical means or by the introduction of an inert gas or in any other suitable way.

In general such boiling is carried out at subatmospheric pressure, at for example 60 cms. of mercury and at a temperature of about 70° C. Naturally, if the process is carried out at subatmospheric pressure, a suction pump or the like should be provided for the evacuation of the sulphur dioxide. In that case, the sulphur dioxide is best caused to pass through an alkaline solution (lime, soda, etc.) so as to prevent damage being done to the pump or other mechanism.

The condensation of the condensable products can be effected by contact of the vapours with the cold walls of the apparatus and can be helped by a decrease of pressure in the region of these walls. The decrease of pressure can be effected by passing the vapours through a passage of variable cross section.

The return of the condensed products to the mass under treatment is important if the taste of the foodstuffs is not to deteriorate. It is of great importance that the condensed products should not, during their return, come into prolonged contact with the sulphur dioxide which is evolved so as to avoid resulphurisation which would destroy at least in part the principal effect which the treatment in accordance with the invention seeks to obtain. This undesirable contact can be prevented, for example, by returning the condensed products over a path different from that followed by the sulphur dioxide. In practice, it is generally sufficient to allow the condensed products to flow along the cold walls on which the condensation has taken place, care being taken to see that no drops fall off the walls into an atmosphere containing sulphur dioxide.

In order that the invention may be properly understood and be more readily carried into effect, two examples of a process in accordance with the invention which are particularly suitable for the desulphurisation of fruit juice will now be described with reference to the accompanying drawings in which—

Figure 2:
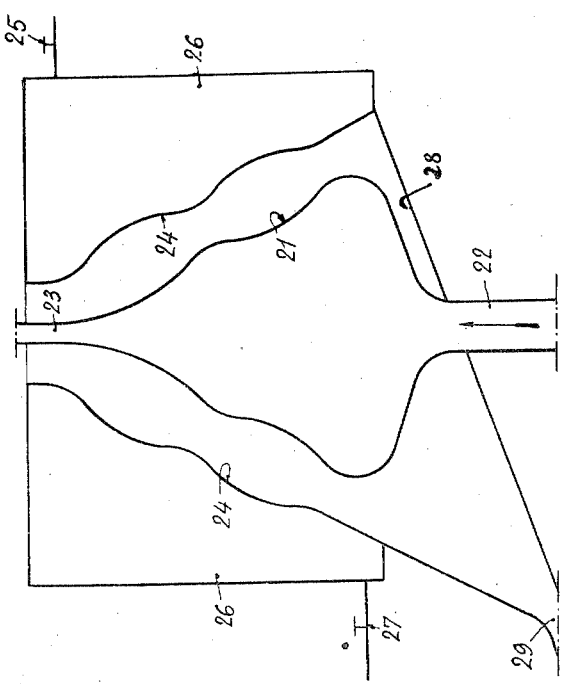

Figure 1 is an elevation partly in section of the apparatus used for the process and Figure 2 shows diagrammatically a modified form of part of the apparatus of Figure 1.

The apparatus shown in Figure 1 has a container 1 for the fruit juice to be treated. It will be assumed that 200 kgs. of grape juice are delivered to it through a delivery pipe 2 while a suction pump 3 is operated so as to deaerate the juice. Above the container 1, there is a condenser 4 having a jacket through which water is circulated by means of the inlet and outlet pipes 5 and 6.

The container 1 is heated by a steam jacket 7. By regulating the pump 3 to produce a subatmospheric pressure of 55 cms. of mercury in the container, the juice is made to boil at about 70° C. This temperature is maintained for about 25 minutes and the supply of steam is then shut off but the pump 3 is left working. A few minutes later, without stopping the pump 3, an air cock 8 is opened so as to cause the pressure in the container to rise to atmospheric. The cock 8 can, alternatively, lead to a source of inert gas at atmospheric pressure or above. The drain cock 9 is then opened and the contents of the container drawn off into bottles which have been sterilised by pasteurisation.

If a single treatment fails to remove a sufficient quantity of the sulphur products in the juice, it can be repeated before the juice is drawn off.

The boiling of the juice causes the sulphur dioxide in the juice, both in the free and the combined state and also certain other particularly volatile products to be evolved from the mass in the container. The vapours thus produced pass into the uptake 10 of the cooler 4. The walls of the uptake 10 are kept cool and practically all the vapours except the sulphur dioxide vapour will condense on them. The condensation is helped by the expansion of the vapours as they pass out of the throats 14 in the uptake 10. The sulphur dioxide vapour is bubbled into an alkaline solution in a saturator 11 which absorbs the greater part of it, the remainder being evacuated by the pump 3.

The products which are condensed on the walls 10 flow along those walls which are inclined and shaped so as to prevent the liquid from dripping off them. At the lower end of the uptake 10, the condensed products flow into a gutter 12 and thence into a passage 13 to the mass under treatment without coming into contact with the sulphur dioxide which is being given off by the mass.

The process and apparatus described above are suitable for batch working. Figure 2 shows diagrammatically an apparatus suitable for continuous working.

Here, there is a substantially conical uptake 22, 23 through which steam is passed. The juice to be treated flows down over the outer wall 21 of the uptake in a very thin layer.

The steam uptake lies within a water jacket 26 having an inlet 25 and an outlet 27 and the upper end of the space between the uptake and the jacket is connected to a suction pump or other device for creating a sub-atmospheric pressure in the space. The sulphur dioxide and certain other volatile products are evaporated off by the heat of the wall 21 and the low pressure. The sulphur dioxide vapour escapes at the top and is collected as in the case of Figure 1. The vapours which are to be returned to the juice are condensed by striking the cool wall 24 and flow down this wall which is designed so that the condensed liquid finally flows down the sloping base 28 and is evacuated through the outlet 29 together with the desulphurised juice.

I claim:

1. A desulphurizing process for vegetables which have been subjected to the action of a sulphurous agent comprising the steps of heating a mass of said products to a temperature sufficient to drive off the sulphurous agent; bringing the vapors generated thereby in contact with a relatively cold surface while permitting them to expand; collecting the condensate; and passing it back into the mass of products while substantially keeping it out of contact with said vapors.

2. A desulphurizing process for vegetables which have been subjected to the action of a sulphurous agent comprising the steps of heating a mass of said products to a temperature sufficient to drive off the sulphurous agent; bringing the vapors generated thereby in contact with a relatively cold surface while permitting them to expand; permitting the condensate to accumulate by gravity flow; and passing the accumulated liquid back into the mass of products while substantially keeping it out of contact with said vapors.

3. A desulphurizing process for vegetables which have been subjected to the action of a sulphurous agent comprising the steps of subjecting the mass of said products to a sub-atmospheric pressure and to a temperature sufficient to drive off the sulphurous agent; bringing the vapors generated thereby in contact with a relatively cold surface while permitting them to expand; permitting the condensate to accumulate by gravity flow; and passing the accumulated liquid back into the mass of products while substantially keeping it out of contact with said vapors.

MICHEL PAUL PIERRE FLANZY.

REFERENCES CITED

The following references are of record in the file of this patent:

UNITED STATES PATENTS

| Number | Name | Date |
| --- | --- | --- |
| 1,305,244 | Bacon | June 3, 1919 |
| 1,353,169 | McDermott | Sept. 21, 1920 |
| 1,609,705 | Forrest | Dec. 7, 1926 |
| 1,625,542 | Hostettler | Apr. 19, 1927 |
| 1,871,019 | Walker | Aug. 9, 1932 |
| 2,104,710 | Blanck | Jan. 4, 1938 |
| 2,169,367 | Mills | Aug. 15, 1939 |
| 2,298,933 | Elion | Oct. 13, 1942 |
| 2,361,695 | Lizeray | Oct. 31, 1944 |
| 2,374,219 | Lee | Apr. 24, 1945 |